Figure 2:
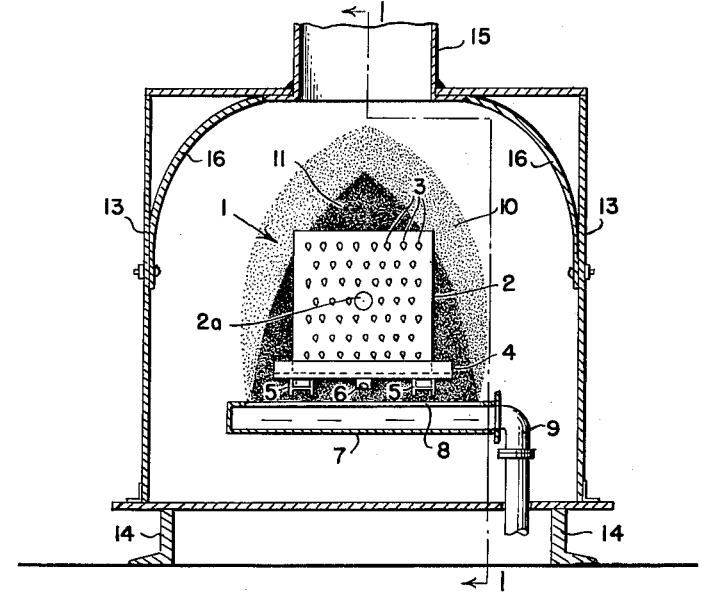

May 2, 1961   D. H. CLEAVER   2,982,741
CATALYST MANUFACTURE
Filed Aug. 15, 1957

INVENTOR.
DAVID H. CLEAVER
BY

ATTORNEY

United States Patent Office 2,982,741
Patented May 2, 1961

2,982,741

CATALYST MANUFACTURE

David H. Cleaver, Chester, Pa.

Filed Aug. 15, 1957, Ser. No. 713,277

(Filed under Rule 47(b) and 35 U.S.C. 118)

7 Claims. (Cl. 252—466)

This invention relates to the manufacture of catalysts and more specifically is concerned with an improved method for reducing heavy metal salts or oxides used in their manufacture.

In one of the common process steps in the manufacture of catalysts, a catalyst-supporting material, which may be shaped or in powder form, and which itself may or may not have catalytic activity, is impregnated or coated with a solution of a heavy metal salt which is then reduced leaving the catalytically active metal on the supporting material in a finely divided condition. Pellets of catalytic alumina for example may be impregnated with a salt of platinum, palladium, silver, copper, chromium, etc. Following the impregnation, the metal salt is reduced, depositing the metal in a completely or partially reduced form on the support.

The reduction may be accomplished in a variety of ways. Thermal reduction, that is reduction by heat alone, may be employed, for example. In many cases, however, thermal reduction is subject to the disadvantage of requiring undesirably high temperatures and often proceeds at an undesirably slow rate. Particularly in the large scale preparation of catalysts the use of high temperatures is obviously undesirable from the standpoint of heat economy and equipment costs. The reduction of the sale can be carried out at substantially lower temperatures by the use of a reducing gas such as hydrogen or carbon monoxide. It has been found, however, that when the reduction is carried out in ordinary equipment where the reducing gas becomes mixed with atmospheric air, the mixture of air and reducing gas tends to react at the surface of the catalyst whenever the reduced metal salt or oxide has oxidation activity, as is the case to a greater or lesser degree with the reduced salts of the heavy metals. This catalytic oxidation occurring at the surface of the catalyst causes undesirable uneven heating of the catalyst and interferes with the smoothness and completeness of the reduction.

These undesirable side effects occasioned by the presence of oxygen can of course be avoided by heating the catalyst in a specially designed chamber containing a reducing atmosphere from which air has been excluded. This procedure, however, is subject to the disadvantage that relatively expensive equipment is required, and that it is difficult to carry out except by a batch method.

In accordance with the present invention a simple and inexpensive method has been found for effecting complete and rapid reduction of heavy metal salts or oxides at relatively low temperatures and without the use of elaborate measures for excluding atmospheric oxygen. The procedure of the invention makes practical the utilization of inexpensive equipment such as a relatively low temperature tunnel oven through which the catalyst may be moved on a continuous conveyor belt for effecting the reduction of the salt or oxide.

Briefly, the invention involves heating the catalyst support, upon which a heavy metal salt or oxide is deposited by impregnation or other suitable means, to the temperature at which the salt or oxide readily undergoes reduction in the presence of a reducing gas, and then passing the thus heated support through a curtain of a reducing gas which is surrounded by an envelope of flame created by burning the outer portions of the curtain of reducing gas in the presence of atmospheric oxygen. The area of the curtain of gas, including the peripheral portions which are burning, should be such that the catalytic surface containing the undecomposed metal salt first passes through the flame area and then is enveloped by the inner flameless portion of the gas curtain. Under these conditions, decomposition of the metal salt may be accomplished rapidly and completely and at a relatively low temperature without any further precautions for excluding atmospheric oxygen from the catalyst.

The invention is generally applicable for the reduction of the salts or oxides of the heavy metals from groups I, VI, and VIII of the periodic table, namely the salts or oxides of copper, silver, gold, chromium, molybdenum, tungsten, uranium, iron, cobalt, nickel, ruthenium, rhodium, palladium, osmium, iridium, and platinum. Upon complete or partial reduction of the salts or oxides of these metals, the partially or completely reduced product possesses oxidizing activity such that when exposed to a mixture of oxygen and reducing gas, such as a mixture of air and hydrogen or carbon monoxide, it tends to promote the catalytic oxidation of the reducing gas which, as mentioned previously, interferes with the smoothness and completeness of the reduction operation.

Although the invention is particularly applicable to the salts of these metals with strong mineral acids such as the salts of hydrochloric, hydrobromic, nitric, sulfuric acid and the like, it is also applicable to the salts of these metals with acids in general including organic acids such as formic, acetic, propionic, etc.

The nature of the support or carrier in the practice of the invention is not critical assuming of course it does not undergo destruction in the course of the reduction operation. Thus materials such as activated alumina, magnesia, thoria, beryllia, or silica may be used, as well as porcelain, asbestos gauze, fused alumina or silica or other fused refractory oxides.

The function of the support insofar as it relates to the practice of the invention is a physical one, namely that of providing a surface over which the salt or oxide ot be reduced is spread in a thin layer so that efficient contact is made between the gas curtain and the material to be reduced. Choice of any particular carrier or supporting material on which the heavy metal salt or oxide is to be deposited is determined of course by the end use to which the catalyst is to be put. For high temperature reactions such as catalytic oxidation at temperatures of 500° F.–1200° F. for example, a support of a material capable of withstanding relatively high temperatures will of course be chosen such as an activated difficultly reducible oxide, such as alumina or silica, or asbestos, unglazed porcelain, or the like.

For a better understanding of the invention, reference is now made to the accompanying drawings which illustrate in a semi-diagrammatic fashion one method for practicing the invention.

Figure 1:
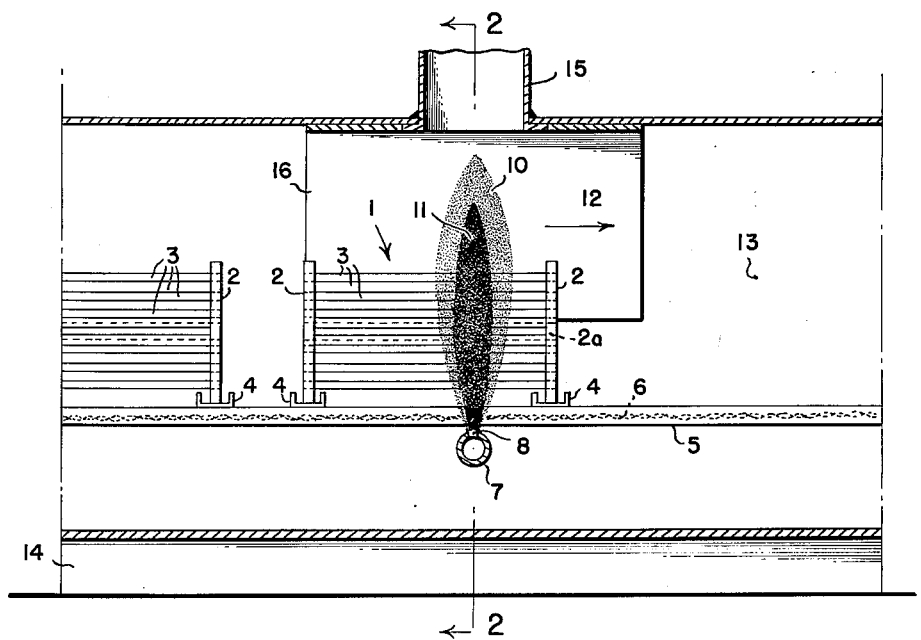
Figure 3:
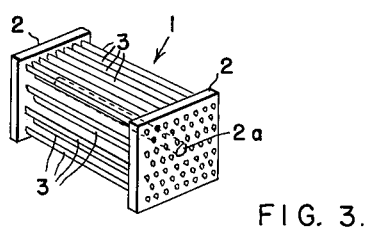

Fig. 1 shows a catalytic unit passing through a curtain of a reducing gas which is burning at its outer edges; and Fig. 2 is a section taken on line 2—2 of Fig. 1; and Fig. 3 is a perspective of the catalytic unit shown in Figs. 1 and 2.

The catalytic unit, generally designated by the reference numeral 1, consists of a pair of parallel end plates 2 which support between them a plurality of staggered rows of porcelain rods 3. End plates 2 are secured together by a central post 2a, which is cemented in sockets provided for receiving this post in each of the end plates. The rods 3 are composed of substantially impervious porcelain of the type used in the manufacture of spark plugs. They are coated with a thin film, preferably from .001" to .006" thick of a catalytically active stable oxide such as alumina, beryllia, thoria, or magnesia. This film is impregnated with a salt of a catalytic metal having oxidation activity such as platinum, palladium, silver, or the like. After impregnation of the stable metal oxide film with the metal salt, such as chloroplatinic acid, the units are placed on a traveling belt conveyor and continuously moved through a heated zone which conveniently may be a simple constructed tunnel oven as shown, having its walls 13 constructed of heat insulating material and supported on beams 14. Each unit is supported on U-shaped supports 4 which slide on supporting I-beams 5. A conveyor chain 6, driven by means not shown, is connected to the supports 4 and move the supports through the oven in the direction indicated by the arrow 12.

After the units have been heated to the required temperature they pass through a curtain of reducing gas supplied from beneath the conveyor by a horizontal conduit 7 having a longitudinal slot 8 extending across the width of the conveyor belt. A substantially oxygen-free reducing gas is supplied to the conduit 7 by line 9. The gas stream issuing from slot 8 is ignited before contact with each unit by a pilot light or other suitable means, and the outer portions of the stream burn as a result of the contact of the gases in the outer portion of the gas curtain with atmospheric oxygen. As a result, two zones are formed in the curtain of gas rising from the slot 8. An outer envelope of burning gas exists indicated by the reference numeral 10, while the inner portion 11 of the curtain of gas is substantially oxygen free. It is important that the gas curtain be of such dimensions and shape that the entire catalytic surface will pass through the inner curtain of reducing gas as well as the outer envelope of burning gas.

In order to control the shape and size of the curtain of reducing gas and the outer envelope of flame, the draft conditions must be carefully controlled. A suitable arrangement for accomplishing this is shown in the drawings. Directly over the flame a cylindrical flue 15 is provided. An asbestos baffle 16 assures smooth flow of the rising gases, thereby avoiding turbulence in the vicinity of the reduction zone. Obviously, arrangements other than that shown may be used.

The avoidance of turbulent conditions in the vicinity of the gas curtain is important from the standpoint of preventing atmospheric air from entering the inner portion 11. When the substantially oxygen-free reducing gas flows upwardly from the slot 8 in a smooth, relatively undisturbed stream as indicated in the drawings, oxygen from the atmosphere may penetrate to the inner portion 11 of the gas curtain by way of diffusion. But since penetration by diffusion is relatively slow compared to the rate of flow of gas necessary to form the curtain, very little if any oxygen diffuses into the central portion 11 in the lower portion of the curtain in contact with the catalyst. The oxygen that diffuses into the outer envelope 10 reacts with the reducing gas in this outer envelope with the production of a yellow, luminous flame. Virtually all the oxygen entering the peripheral portion 10 is thus consumed. The resultant products of combustion, $H_2O$ and $CO_2$ may thereafter diffuse into the central portion 11 but the presence of these combustion products is not detrimental. The burning peripheral portion 10 thus acts as a barrier in a smoothly flowing gas curtain to exclude atmospheric oxygen from the inner portion 11.

In the equipment shown, the substantial exclusion of oxygen from the central portion of the curtain can be readily observed by sighting along the slot 8. When observed in this manner two well defined peripheral walls of flame can be seen at either edge of the slot corresponding to the peripheral portions 10, as shown in Fig. 1 of the drawings. Between these walls of flame a ribbon of substantially oxygen-free, non-flaming gas can be clearly observed.

The special type of gas curtain described above and illustrated by the drawings is to be sharply distinguished from the flame emitted by a conventional burner, such as a Bunsen burner. In the conventional burner every effort is made to insure thorough and homogeneous mixing of the air with the fuel gas by premixing with air and/or by turbulence in the vicinity of the flame, so that efficient combustion is obtained. To this end, in a Bunsen burner for example, a mixture of air and gas is formed at the bottom of the burner by the inspiration of air so that the gas issuing from the top of the burner contains a fuel-air mixture. Under these conditions burning occurs in the central portion of the gas stream issuing from the top of the burner because of the presence of oxygen in the mixture. Burning also occurs at the outer portions of the issuing gas stream as a result of the diffusion of atmospheric air into these outer portions.

According to the invention, on the other hand, every precaution should be taken to exclude oxygen from the inner portion of the gas curtain by initially supplying substantially oxygen-free gas to form the curtain and also by arranging conditions such as to insure a smooth, non-turbulent flow of the gas curtain so that oxygen is able to diffuse into the outer portions only and is substantially excluded from the inner portion while the curtain is in contact with the catalyst.

Referring again to the drawings, it may be seen that as the catalytic unit 1 travels from left to right (as seen in Fig. 1) through the gas curtain the porcelain rods 3 containing the undecomposed salt will first pass through the peripheral portions 10 which are burning in the presence of oxygen which diffuses into these outer portions from the air. This in effect purges the oxygen from the surface of the rods. The rods then pass into the inner portion 11 and are there exposed to a substantially oxygen-free reducing atmosphere, whereupon the salt is reduced uniformly and substantially completely to finely divided metal. During this reduction operation no appreciable heating of the coated porcelain rods occurs as would be the case if uncombined oxygen were present in the inner portion 11. In contrast, if the preheated catalytic units are exposed in the same manner to a curtain of reducing gas in the absence of the outer envelope of flame, catalytic oxidation of the gas-air mixture which forms at the peripheral portions of the reducing gas curtain occurs immediately at the surface of the rods causing them to glow at a red heat. Under these circumstances the reduction of the salt is incomplete and non-uniform. Furthermore, the undesirable non-uniform heating of the units which occurs has been found to cause breakage of a substantial percentage of the units treated.

*Example*

In one particular application of the invention, a catalytic unit of the type illustrated in the drawings was first provided with a tightly adherent film of catalytic alumina having a thickness of about .003" by the method described in United States Patent No. 2,580,806. The coated unit was then dipped in a 1% aqueous solution of chloroplatinic acid ($H_2PtCl_6.6H_2O$) and then permitted to drain. The units, carrying a yellow deposit of the platinum salt were loaded on a traveling belt conveyor and passed through a tunnel oven heated by infra red lamps. When the catalytic unit attained a temperature of about 600° F.–700° F. it was passed through a curtain of reducing gas burning at its outer portions as illustrated in the drawing. The reducing gas curtain, with its envelope of burning gas, was supplied by a conduit provided with a slot about 0.063" wide and about 5" long, the conduit being supplied with substantially oxygen-free city gas. The catalytic unit, about 6" long and 3" wide was passed through this curtain of reducing gas with its envelope of burning gas at a rate of about 1 foot per minute.

Under these conditions, complete and almost instantaneous decomposition of the platinum salt took place. Little or no additional heating of the porcelain rods occurred, indicating that substantially no oxidation took place at their surface. After passing through the reducing gas curtain, the units were almost immediately taken from the oven and exposed to atmospheric temperatures. No breakage whatsoever of the units occurred. In contrast, when the decomposition of the platinum salt was accomplished with the use of a stream of reducing gases in the absence of the envelope of burning gases, it was necessary to preheat the units to a temperature of approximately 1000° F., in order to effect satisfactory decomposition of the platinum salt. Furthermore, during the reduction operation a vigorous reaction took place at the surface of the porcelain rods, occasioned by mixing of surrounding atmospheric oxygen with the reducing gas, causing them to glow to a red heat. Due to this excessive heating, when the units were withdrawn from the oven into the atmosphere breakage of about 20% of the units processed took place.

The temperature to which the catalyst should be preheated before contact with the curtain of reducing gas depends, of course, on the particular metal salt or oxide to be reduced, and depends also somewhat on the residence time of the preheated catalyst in the reducing zone. The contact time in the reducing zone can be controlled in a conveyor type operation as shown by controlling the conveyor speed. In some cases where a particularly long contact time is desired a number of gas curtains of the same type can be employed in series. In general, the longer the contact time in the reducing zone the lower is the minimum permissible temperature at which the desired reduction can be effected.

For the salts of the metals of the platinum group such as the platinum, palladium, or ruthenium chlorides, the catalyst should be heated to temperatures of the order of 400° F. to 800° F. to effect reduction with a reasonable residence time in the reducing gas. For reduction of the oxides or salts of metals such as copper, iron, chrominum and nickel somewhat higher temperatures such as from 700° F. to 1400° F. will generally be found desirable. In the case of some salts, e.g. silver salts, complete reduction is readily effected at much lower temperatures such as 100° F. to 300° F.

In any particular case the optimum preheat temperature for the catalyst before entering the reducing gas curtain may be determined by simple experimentation. In some cases complete reduction may not be necessary in which case a somewhat lower preheat temperature may be used. In all cases the carrier with its deposit of metal salt or oxide is heated to a temperature below that at which substantial thermal reduction takes place but at which the desired reduction does take place when exposed to the curtain of reducing gas in the manner set forth. By proceeding in this manner the temperature required for effecting reduction is substantially reduced in contrast to that required for reduction by heat alone, and at the same time use of relatively complex equipment usually required to provide substantially oxygen-free reducing atmosphere is avoided.

The carrier or support for the salt or oxide to be reduced may of course have any desired physical configuration. While the invention has been described with reference to a particular catalytic unit, other shapes such as pellets or granules, regular or irregular in shape, of any suitable carrier such as pellets of activated alumina, and impregnated with the salt or oxide to be reduced, may be employed. In the case of catalyst pellets, these may be treated for example by placing the pellets in a thin layer on a perforated traveling belt by which they are conveyed through a curtain of reducing gas in the manner described.

Still other modifications than those specifically mentioned or illustrated may be made, and it is understood that the invention is not to be limited by the description above, nor in any way except by reference to the scope of the appended claims.

This application is a continuation in part of copending application Serial No. 331,618, filed January 16, 1953, now abandoned by David H. Cleaver, entitled Catalyst Manufacture.

I claim:

1. In the manufacture of supported catalysts an improved method for reducing metallic compounds selected from the group consisting of salts and oxides of the heavy metals from groups I, VI, and VIII of the periodic table used in the preparation of said catalysts which comprises the steps of passing said supported catalyst impregnated with said metal compound through a curtain of substantially oxygen-free reducing gas surrounded by an envelope of burning gas.

2. In the manufacture of supported catalysts an improved method for reducing metallic compounds selected from the group consisting of salts and oxides of the heavy metals from groups I, VI, and VIII of the periodic table used in the preparation of said catalysts which comprises the steps of passing said supported catalyst impregnated with said metal compound through a curtain of substantially oxygen-free reducing gas surrounded by an envelope of flame created by burning of the outer portions of the curtain of reducing gas in the presence of atmospheric oxygen.

3. In the manufacture of catalysts, a method for reducing metallic compounds selected from the group consisting of salts and oxides of the heavy metals from groups I, VI, and VIII of the periodic table, said method comprising the steps of heating a support on which said metal compound is deposited to a temperature at which said compound readily undergoes decomposition in the presence of reducing gas, and then passing the thus heated support through a curtain of substantially oxygen-free reducing gas surrounded by an envelope of burning gas.

4. In the manufacture of oxidation catalysts a method for reducing metal salts selected from salts of the heavy metals of groups I, VI, and VIII of the periodic table which are used in the preparation thereof, said method comprising the steps of heating a support on which such metal salt is deposited to a temperature at which said salt readily undergoes decomposition in the presence of a reducing gas, and then passing the thus heated support through a curtain of substantially oxygen-free reducing gas surrounded by an envelope of flame created by burning the outer portions of the curtain of reducing gas in the presence of atmospheric oxygen.

5. A method in accordance with claim 4 in which said heavy metal salt is a salt of the metal of a platinum group.

6. A method in accordance with claim 4 in which said support comprises activated alumina and said heavy metal salt comprises a platinum salt.

7. A method in accordance with claim 5 in which said support is heated to temperatures of the order of 400° F.–800° F. before contact with said curtain.

References Cited in the file of this patent

UNITED STATES PATENTS

| 817,414 | Brown | Apr. 10, 1906 |
| 2,479,109 | Haensel | Aug. 16, 1949 |
| 2,488,150 | Walden | Nov. 15, 1949 |